UNITED STATES PATENT OFFICE.

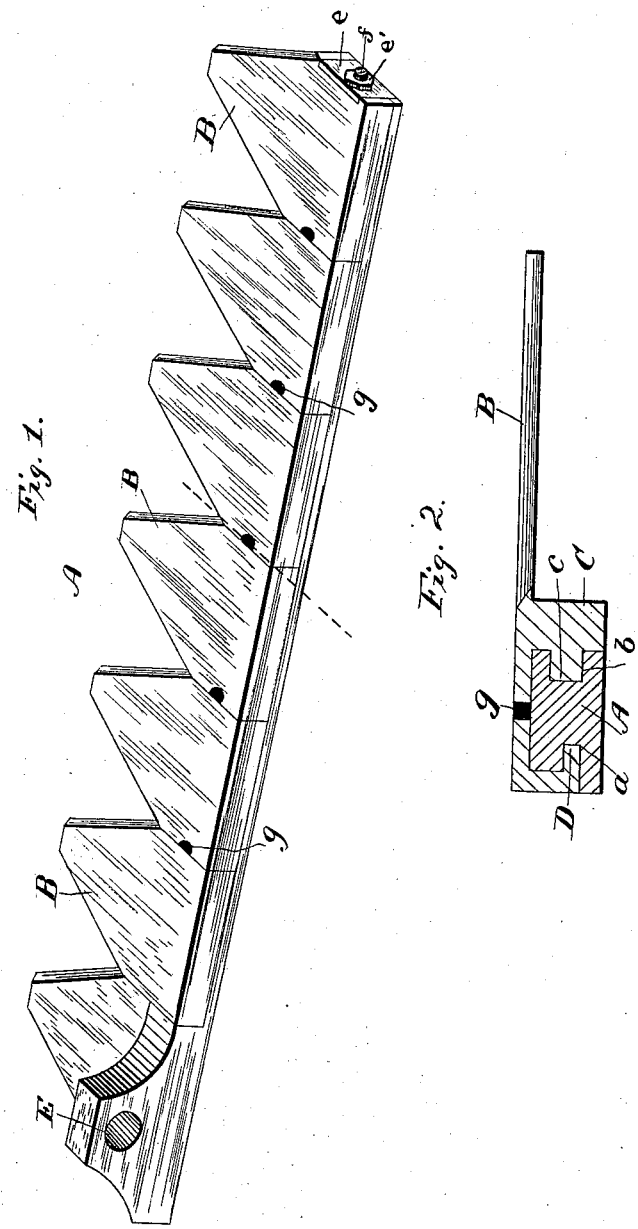

GEORGE R. SIGLER AND WILLIAM G. SIGLER, OF DECATUR, PENNSYLVANIA, ASSIGNORS OF ONE-HALF TO CLARK BARKHOLDER, OF SAME PLACE.

HARVESTER-CUTTER.

SPECIFICATION forming part of Letters Patent No. 323,745, dated August 4, 1885.

Application filed February 28, 1884. (No model.)

*To all whom it may concern:*

Be it known that we, GEORGE R. SIGLER and WILLIAM G. SIGLER, citizens of the United States, residing at Decatur, in the county of Mifflin and State of Pennsylvania, have invented certain new and useful Improvements in Harvester-Cutters; and we do hereby declare the following to be a full, clear, and exact description of the invention, such as will enable others skilled in the art to which it appertains to make and use the same.

Our invention relates to certain improvements in harvester-cutter bars having removable sectional knife-blades, and has for its object to provide an improved means of attaching the knife blades to the cutter-bar, whereby said knife-blades can be readily and easily adjusted and removed, are very strong and durable, and in which the strain is entirely lateral against the sides of the cutter-bar, and not longitudinal, the particular construction and arrangements of which we now proceed to describe, reference being had to the accompanying drawings, in which—

Figure 1 is a perspective, and Fig. 2 a cross-section.

Referring to said drawings, similar letters of reference indicate like parts.

A is the cutter-bar, having the longitudinal slot $a$ on its rear side and the longitudinal slot $b$ on its forward side. The slot $b$ is made wider than the slot $a$ to afford a stronger bearing for the knife-blade against this side of the bar. B are the knife-blades, having the heavy flanges C on their under side. Said flanges C bear against the entire front of the cutter-bar, and have the ribs $c$, which enter the grooves $b$.

D are L-shaped flanges on the rear of the knife-blades, the lower arm of which L-shaped flanges enter the groove $a$. Said flanges C and D are so arranged that the bottom of the flange C is flush with the bottom of the cutter-bar, and the rear side of the flange D is flush with the lower rear edge of said cutter-bar. When adjusted on the cutter-bar, the inner knife-blade rests against a shoulder formed by the eye E, and said knife-blades are held in place and prevented from longitudinal movement by the washer $e$ and nut $e'$ on the screw $f$ at the end of the cutter-bar. The washer $e$ is countersunk in the end of the outer knife-blade to prevent the same from turning.

$g$ are notches in the top of the knife-blades B, in which a suitable hook is inserted to pull the same off the cutter-bar. By this construction and arrangement of parts the greater part of the strain is borne directly and laterally by the heavy flange C bearing against the forward side of the cutter-bar, and by having the bottom of said flange C flush with the bottom of the bar it is impossible for anything to be forced between said bar and knife-blades.

We are aware that cutter-bars have heretofore been used having knife-blades attached by means of cleats or flanges on their under side fitting in grooves in the cutter-bar. This we do not claim; but

What we claim as new, and desire to secure by Letters Patent, is—

The herein-described harvester-cutter, consisting of the cutter-bar A, having the longitudinal grooves $a$ and $b$ and screw $f$, in combination with the knife-blades B, provided with the flanges C, having the ribs $c$, and the L-shaped flanges D, the washer $e$, and nut $e'$, substantially as set forth.

In testimony whereof we affix our signatures in presence of two witnesses.

GEORGE R. SIGLER.
WILLIAM G. SIGLER.

Witnesses:
AARON B. GROFF,
OLIVER C. GROFF.